(12) United States Patent
Kruesi

(10) Patent No.: US 7,955,749 B2
(45) Date of Patent: Jun. 7, 2011

(54) CARBON-FUELED FUEL CELL

(75) Inventor: Paul R. Kruesi, Golden, CO (US)

(73) Assignee: Cato Research Corporation, Golden, CO (US)

( * ) Notice: Subject to any disclaimer, the term of this patent is extended or adjusted under 35 U.S.C. 154(b) by 952 days.

(21) Appl. No.: 10/598,517

(22) PCT Filed: Mar. 2, 2005

(86) PCT No.: PCT/US2005/006982
§ 371 (c)(1),
(2), (4) Date: Sep. 1, 2006

(87) PCT Pub. No.: WO2005/086262
PCT Pub. Date: Sep. 15, 2005

(65) Prior Publication Data
US 2007/0172710 A1    Jul. 26, 2007

Related U.S. Application Data

(60) Provisional application No. 60/549,845, filed on Mar. 2, 2004.

(51) Int. Cl.
*H01M 8/08* (2006.01)
*H01M 8/14* (2006.01)
*H01M 8/22* (2006.01)

(52) U.S. Cl. ........ 429/477; 429/476; 429/499; 429/502; 429/505

(58) Field of Classification Search .............. 429/12–46, 429/400, 472, 476–478, 498–500, 502–503, 429/505
See application file for complete search history.

(56) References Cited

U.S. PATENT DOCUMENTS

| | | | |
|---|---|---|---|
| 3,085,053 A | | 4/1963 | Taylor |
| 3,470,026 A | | 9/1969 | Juda et al. |
| 3,497,389 A | * | 2/1970 | Berger et al. ............... 429/33 |
| 4,711,828 A | * | 12/1987 | Ishida et al. ............... 429/12 |
| 6,200,697 B1 | * | 3/2001 | Pesavento ............... 429/28 |
| 6,692,861 B2 | | 2/2004 | Tao |
| 2002/0015877 A1 | * | 2/2002 | Tao ............... 429/40 |
| 2002/0106549 A1 | * | 8/2002 | Cooper et al. ............... 429/40 |

OTHER PUBLICATIONS

International Search Report dated Jun. 15, 2005, for PCT Application No. PCT/US05/06982.
PCT Written Opinion dated Jun. 15, 2005, for PCT Application No. PCT/US05/06982.

* cited by examiner

*Primary Examiner* — Basia Ridley
*Assistant Examiner* — Jacob Buchanan
(74) *Attorney, Agent, or Firm* — Sheridan Ross, P.C.

(57) ABSTRACT

A fuel cell in which carbon and water react to form hydrogen or water. The cells utilize electrolyte materials that hold or coordinate water to allow the useful reaction of carbon and water at moderate temperatures without the use of expensive pressure reactors. Activated carbon or carbon recovered from organic waste is used to fuel these cells to produce hydrogen gas or carbon dioxide and power at moderate temperatures and at very low cost.

2 Claims, No Drawings

CARBON-FUELED FUEL CELL

CROSS REFERENCE TO RELATED APPLICATION

This application claims priority under 35 U.S.C. §119(e) to U.S. Provisional Patent Application Ser. No. 60/549,845 filed Mar. 2, 2004, which is incorporated herein in its entirety by this reference.

FIELD OF THE INVENTION

The invention resides in the field of energy production and specifically in the production of electricity and hydrogen by the reaction of carbon at an electrode producing carbonate ions.

BACKGROUND OF THE INVENTION

The need for lower cost electricity produced with reduced adverse environmental impacts has created a great deal of interest in fuel cells which create electricity by chemical reactions at electrodes. The outstanding advantage of the fuel cell is the very high efficiency by which it can convert the thermodynamic energy potential of the reactants into electricity. This efficiency can be as much as twice the efficiency of thermal conversion methods such as steam turbines and internal combustion engines. Additionally, the fuel cell is a mechanically simple device, lending itself to compact and comparatively inexpensive installations. Further, as the process does not involve extreme temperatures or large gas flows for the energy-producing source, there are excellent opportunities to insure the recovery of undesirable impurities. A great deal of current fuel cell development is being placed on hydrogen fuel cells with their advantageous oxidation product of water.

Hydrogen, despite the ease of its use and attractive water by-product, has certain disadvantages. For example, hydrogen is very difficult to store. Because it can be liquified only at extremely low temperatures, it is practically stored at very high pressures in cylinders of great strength, or stored as a compound such as metal hydrides, or in nano-sized carbon tubes. In all of these alternatives, the light weight hydrogen is less than 15% of the weight of the storage device.

The production of hydrogen of a purity suitable to sustain fuel cell use is another difficulty with the current fuel cell technology. Electrolytic production, while meeting purity goals, has heretofore presented no electric energy advantage. Production by the reforming of natural gas (primarily methane) requires a large energy input for the reforming reaction, and starts from an increasingly expensive material. Producing hydrogen by the water gas reaction suffers from inherent difficulties including the production of carbon monoxide and an endothermic reaction to which large amounts of heat must be supplied, making it a complex and expensive process. Further, the carbon monoxide produced in the reaction is a poison to hydrogen cells, requiring difficult carbon monoxide reactions or separations to achieve suitable hydrogen quality from this process.

When compared to hydrogen, carbon is widely available. Concentrated in coal, it is the preferred and most heavily-used source of energy in the world for the production of electricity. Carbon-containing organic materials are ubiquitous in nature in forms such as wood, paper, plastics, cloth, and rubber. These materials constitute the major components of land-filled waste. All of these materials may be efficiently converted to carbon and water as described in international application PCT/US2004/012343 (WO 2004/096456 A2) which is incorporated herein by this reference. Thus, carbon is available both inexpensively and with environmental advantage as a source for electricity production.

It has long been recognized that it would be very advantageous if carbon could be electrolytically-processed to either hydrogen, or directly to electricity. U.S. Pat. No. 4,226,683 to Vaseen describes an electrolytic cell that converts carbon to hydrogen by the carbon-water reaction. The oxygen in the water producing carbon dioxide at one electrode, while hydrogen is produced at the second electrode. The cell operates at a high temperature (180° C.) and requires a high pressure containment to overcome water's gas state at this temperature. The cell further requires a circulating organic depolarizer to remove the carbon dioxide and hydrogen from the system.

U.S. Pat. No. 6,200,697 to Pesavente describes a carbon-air fuel cell. The cell operates at 400° C. in mixed fused metal hydroxides. Water is introduced as a gas in the incoming air (oxygen) stream. The reaction of water with certain chemicals assists in the discharge of carbon dioxide from the carbonates formed in the reaction. The high temperature involved and the complexity of the carbon dioxide discharge are disadvantages of this system.

Cherepy et al. (*Journal of the Electrochemical Society*, 152(1):A80 January, 2005) demonstrate a carbonate fused salt fuel cell, without hydrogen ion, operating at 800° C. which has a woven ceramic separator. This cell combines the reaction of carbon and carbonate ions at the anode to produce electrons and carbon dioxide, with oxygen oxidation of carbon dioxide with electrons at the cathode to produce carbonate ions. However, the high temperature operation of this cell concept is particularly disadvantageous.

Therefore, there is a long felt need for a means of producing energy in a fuel cell using carbon as a fuel source, which operates at a practical temperature. Preferably, the system would also generate high purity hydrogen at a commercially-acceptable price.

SUMMARY OF THE INVENTION

The present invention overcomes the problems of the prior art to provide a carbon-fueled fuel cell utilizing a membrane that separates the anode and the cathode and an electrolyte that holds water as a compound or in a coordinated state. The carbon fuel is typically an activated carbon and preferably is a carbon recovered from organic waste. An anode in the fuel cells may be catalytically-enhanced carbon, nickel metals and graphites while cathodes may be stainless steel, catalytic carbons, porous nickels, oxygen-reacting cathodes, and graphites. A membrane used in these fuel cells should be a proton permeable membrane such as a ceramic cloth or a NAFION™ membrane. An electrolyte in these fuel cells may be an alkaline hydroxide or a hydrated alkaline earth chloride such as sodium hydroxide, potassium hydroxide, hydrated magnesium chlorides, hydrated calcium chlorides, hydrated strontium chlorides, magnesium hydroxides, magnesium oxides, iron carbonates, manganese carbonates, cerium carbonates and mixtures of these chemicals.

These cells may also be coupled with a regeneration cell that includes an alkaline chloride electrolyte and a membrane separating the anode and the cathode. A regeneration cell includes an anode such as coated titanium and catalyzed carbon and a proton-permeable membrane similar to the fuel cells described above. The alkaline chloride electrolyte may include sodium chloride and/or potassium chloride. The anodes and cathodes in these regeneration cells can be formed into a bipolar array in which a single graphite carbon electrode having two sides has the anode on one side and the cathode on the opposite side.

In an embodiment, a method of producing hydrogen is provided in which carbon reacts with water in the absence of oxygen in a fuel cell having an alkaline hydroxide electrolyte and a membrane separating the anode and the cathode. In this reaction, an alkaline carbonate is formed at the anode and hydrogen gas is formed at the cathode. The carbon in these reactions is typically activated carbon and/or a carbon recovered from organic waste, and the alkaline hydroxide is typically sodium hydroxide, potassium hydroxide or mixtures of these two hydroxides.

One embodiment is a method of forming carbon dioxide by reacting carbon with water in the presence of a carbonate and oxygen in a fuel cell. In this reaction, the fuel cell has an electrolyte and a membrane separating the anode and the cathode. Carbon dioxide is generated at the anode and carbonate is formed at the cathode. The carbonate is may be magnesium carbonate, iron carbonate, manganese carbonate and/or cerium carbonate, and either or both of the anode and the cathode contains nickel metal.

Another embodiment is a method of forming carbon dioxide by reacting carbon dioxide with either magnesium hydroxide and/or magnesium oxide to form a bicarbonate which reacts with carbon to form carbon dioxide. In this reaction, the bicarbonate and the carbon react in a fuel cell having membrane separating the anode from the cathode. The magnesium carbonate is formed at the cathode. Water may be added to the magnesium hydroxides and magnesium oxides before these chemicals contact the carbon dioxide. Anodes and cathodes for these cells preferably contain nickel metal. The carbon source preferably contains a carbon recovered from organic waste. The electrolyte is typically an alkaline hydroxide or an alkaline metal hydrate or a combination of these chemicals.

One embodiment is a method of producing hydrogen by contacting carbon with an alkaline hydroxide in a fuel cell in which a carbonate is formed at the anode and hydrogen gas is formed at the cathode. In these fuel cells, the alkaline hydroxide is preferably either sodium hydroxide or potassium hydroxide or a mixture of these two chemicals.

DETAILED DESCRIPTION OF THE INVENTION

The present invention is drawn to a carbon-fueled fuel cell including an anode, a cathode, a membrane that separates the two electrodes, and an electrolyte that holds water as a compound or in a coordinated state. The cell is advantageously capable of generating electricity, or hydrogen, using a carbon-water reaction at temperatures below about 200° C. and at atmospheric pressures.

The reaction of water and carbon at moderate temperatures is particularly advantageous in that carbon materials readily adsorb water into the carbon matrix. Where wetting is difficult, there are numerous very effective surfactants which enhance water contact with carbon at the surface of the carbon. But the problem has arisen that, at the normal boiling temperature of water, the kinetics of the carbon-water reaction are not sufficient for a practical means of producing energy. While greatly increased pressure overcomes this limitation, the necessary pressure vessel is a heavy, costly solution. There are, however, a number of materials that hold water, either as a compound or in a coordinated state. These compounds include hydroxides, chlorides and phosphates. One or more of these materials are used in the fuel cells of the present invention to serve as both the electrolyte, carrying a current at low resistance, and as the source of water for reaction at temperatures as high as about 200° C. They can carry this water at atmospheric pressure.

In the reactions carried out in the fuel cells of the present invention, it is advantageous that the carbon have a high surface area. Reactivity of the carbon is also enhanced by the intercalation of sodium and/or potassium ions. Additionally, catalysts, such as cerium oxide are helpful in improving reactivity.

The carbon source for use in the fuel cells of the present invention may include amorphous carbon, graphite, coke, activated carbon or mixtures of these carbon entities. Preferably, the carbon source for use in these fuel cells is carbon produced as described in international application PCT/US2004/012343 (WO 2004/096456 A2).

Thus, in one embodiment, a carbon-fueled cell of the present invention may include an alkaline hydroxide electrolyte and a carbon source. Preferably, the alkaline hydroxide is sodium hydroxide or potassium hydroxide. The carbonation of sodium or potassium hydroxide, producing either electricity or a combination of both hydrogen and electricity, involves the operation of a fuel cell at high hydroxide concentrations. Typically, these hydroxide concentrations are above about 50 weight percent NaOH or above about 50 weight percent KOH at elevated temperatures. The kinetics of these reactions are practical for the production of electricity at temperatures between about 135° C. and about 200° C. As there is less retained water in the hydroxides as the temperature rises, the internal resistance of the fuel cells incorporating these hydroxides will also rise, although this effect is small within the operable temperature range. Preferably, the fuel cells of the present invention utilizing a hydroxide electrolyte are operated at a temperature of between about 135° C. and about 180° C. More preferably, these fuel cells are operated at a temperature of about 150° C.

The anodes for use in the fuel cells of the present invention utilizing alkaline hydroxide electrolytes include anodes suited to strong alkalis. Catalytically-enhanced carbon and porous nickel metals are suitable examples. Where hydrogen is desired, the cathodes for use in these fuel cells may be the standard high nickel stainless steel cathodes used by commercial electrolytic hydrogen facilities. Where electricity is desired instead of hydrogen, the catalytic carbon or porous nickel powder air, or oxygen-reacting cathodes are suitable.

The reactions taking place in the fuel cell utilizing an alkaline hydroxide are summarized for sodium hydroxide as:

| Location | Reaction | Reaction Number | Delta $G_f$ |
|---|---|---|---|
| Anode: | $2NaOH + C + H_2O \leftrightarrows Na_2CO_3 + 4H^+ + 4e^-$ | 1 | -0.17V |
| Cathode: | $4e^- + 4H^+ \leftrightarrows 2H_2$ | 2 | |
|  | or $4e^- + 4H^+ + O_2 \leftrightarrows 2H_2O$ | 3 | -1.15V |
|  |  | Cell total = | -1.32V | and for potassium hydroxide as:

| Location | Reaction | Reaction Number | Delta $G_f$ |
|---|---|---|---|
| Anode: | $2KOH + C + H_2O \leftrightarrows K_2CO_3 + 4H^+ + 4e^-$ | 4 | -0.21V |

-continued

| Location | Reaction | Reaction Number | Delta $G_f$ |
|---|---|---|---|
| Cathode: | $4e^- + 4H^+ \leftrightarrows 2H_2$ | 2 | |
| | or $4e^- + 4H^+ + O_2 \leftrightarrows 2H_2O$ | 3 | $-1.15V$ |
| | | Cell total = | $-1.36V$ |

The alkali carbonates formed by the reaction at the anode have very limited solubility in the concentrated alkali hydroxides. As a result, the precipitated carbonate may be separated from the circulating anolyte and reacted with carbon dioxide for conversion to bicarbonate. It is inevitable that a small amount of hydroxide in these cells will adhere to the carbonate in the separation and this too is converted to bicarbonate by reaction with carbon dioxide.

In one embodiment, the reaction with carbon dioxide is accomplished by coupling the fuel cell to a regeneration cell. The regeneration cell has as its electrolyte an alkali chloride. These chlorides do not retain water, as do the hydroxides, so that cell operation at atmospheric pressure is limited to about 106° C. While the carbon-water reaction kinetics are not favorable at this temperature, the reactions are augmented by the transitory formation of oxychlorides which enhance the rate of the reaction. The anodes in this regeneration cell can be catalyzed carbon, or DSA™ Coated Titanium. The cathodes may be the standard cathodes of the type used in commercial caustic-chlorine cells. The regeneration cells preferably use the NAFION™ membranes to separate the chloride salt anolyte from the hydroxide catholyte. The reactions occurring in the regeneration cells utilizing sodium or potassium hydroxide, respectively, can be summarized as:

| Location | Reaction | Reaction Number | Delta $G_f$ |
|---|---|---|---|
| Anode: | $Na_2CO_3 + CO_2 + H_2O \leftrightarrows 2NaHCO_3$ | 5 | |
| | $NaOH + CO_2 \leftrightarrows NaHCO_3$ | 6 | |
| | $3NaHCO_3 + 1.5C$ (NaCl media) $\leftrightarrows$ $3Na^+ + 3H^+ + 4.5CO_2 + 6e^-$ | 7 | $-0.1V$ |
| Cathode: | $6e^- + 3Na^+ + 3H^+ + 1.5O_2 \leftrightarrows 3NaOH$ | 8 | $-0.55V$ |
| | | Cell total = | $-0.65V$ |

| Location | Reaction | Reaction Number | Delta $G_f$ |
|---|---|---|---|
| Anode: | $K_2CO_3 + CO_2 + H_2O \leftrightarrows 2KHCO_3$ | 9 | |
| | $KOH + CO_2 \leftrightarrows KHCO_3$ | 10 | |
| | and $3KHCO_3 + C$ (KCl media) $\leftrightarrows$ $3K^+ + 3H^+ + 4.5CO_2 + 6e^-$ | 11 | $-0.16V$ |
| Cathode: | $6e^- + 3K^+ + 3H^+ + 1.5O_2 \leftrightarrows 3KOH$ | 12 | $-0.41V$ |
| | | Cell total = | $-0.57V$ |

These reactions of the regeneration cell, as summarized above, assume a temperature of about 104° C. The Gibbs free energy voltage for the fuel cell coupled to the regeneration cell is $-1.97$ Volts for the sodium hydroxide cells and $-1.93$ Volts for the potassium hydroxide cells. The voltage per mole of carbon reacted (0.92 Volts for sodium and 0.89 Volts for potassium) is slightly lower than the $-1.02$ Volts associated with carbon dioxide production. Additionally, in practice, each cell has an internal resistance and the two-cell configuration aggravates this loss. This can be partially overcome by combining the two cells in a bipolar configuration wherein a graphite-carbon electrode is modified as an anode on one side and as a cathode on the other side.

In one embodiment, a fuel cell designed to have low internal resistance is used to produce both hydrogen and electricity. The hydrogen is produced electrically and is therefore very pure and suitable for use in a standard hydrogen fuel cell. These cells combine Reaction 1 and Reaction 2 to produce sodium carbonate, hydrogen, and 0.17 Volts with Reactions 5 and 6 producing sodium bicarbonate and Reactions 7 and 8 regenerating sodium hydroxide and 0.65 Volts. Thus, these cells use and regenerate sodium hydroxide to produce clean hydrogen gas and electricity. The combined cells have a Gibbs free energy voltage of 0.82 Volts. These reactions are summarized as:

| Reaction | Reaction Number |
|---|---|
| $2NaOH + C + H_2O \leftrightarrows Na_2CO_3 + 4H^+ + 4e^-$ | 1 |
| $4e^- + 4H^+ \leftrightarrows 2H_2$ | 2 |
| $Na_2CO_3 + CO_2 + H_2O \leftrightarrows 2NaHCO_3$ | 5 |
| $NaOH + CO_2 \leftrightarrows NaHCO_3$ | 6 |
| $3NaHCO_3 + 1.5C$ (NaCl media) $\leftrightarrows$ $3Na^+ + 3H^+ + 4.5CO_2 + 6e^-$ | 7 |
| $6e^- + 3Na^+ + 3H^+ + 1.5CO_2 \leftrightarrows 3NaOH$ | 8 |

A similar embodiment is a cell utilizing potassium as the alkaline earth metal to use and regenerate potassium hydroxide, and produce 0.78 Volts. These reactions are summarized as:

| Reaction | Reaction Number |
|---|---|
| $2KOH + C + H_2O \leftrightarrows K_2CO_3 + 4H^+ + 4e^-$ | 4 |
| $4e^- + 4H^+ \leftrightarrows 2H_2$ | 2 |
| $K_2CO_3 + CO_2 + H_2O \leftrightarrows 2KHCO_3$ | 9 |
| $KOH + CO_2 \leftrightarrows KHCO_3$ | 10 |
| $3KHCO_3 + 1.5C$ (KCl media) $\leftrightarrows$ $3K^+ + 3H^+ + 4.5CO_2 + 6e^-$ | 11 |
| $6e^- + 3K^+ + 3H^+ + 1.5O_2 \leftrightarrows 3KOH$ | 12 |

Both the potassium and sodium version of these cells produce the amperage associated with two moles of carbon.

In each of these cells, the anode and the cathode are separated by a membrane that allows the passage of hydrogen ions from the anode to the cathode without passing the electrons that were removed from those atoms. This is generally referred to as a proton-permeable membrane. Such membranes are available commercially, and NAFION™ membranes (a solid polymer similar to TEFLON™ made by DuPont) are examples of commercially available proton-permeable membranes that are well suited for use in the fuel cells of some embodiments of the invention. Alternatively, in one embodiment, the water-carrying ability of the alkaline chlorides is used without the expensive proton exchange membrane by using a ceramic cloth separator and nickel foam electrodes as described by Cherepy et al. (*Journal of the Electrochemical Society*, 152(1):A80 January, 2005). In this embodiment, a practical carbon-fueled fuel cell can be operated at temperatures of about 200° C. or less.

In a similar embodiment, a carbon-fueled cell may include an alkaline earth chloride electrolyte, and a carbon source. Alkaline earth chlorides have hydrates which are stable below about 200° C. These chlorides have a lower water content at temperatures above about 180° C. As this lower water content is accompanied by a lower electrical conductivity, the preferred temperature of operation for a carbon-fueled cell utilizing alkaline earth chloride electrolytes is between about 135° C. and about 170° C. Preferably, the operating temperature is about 150° C. In certain embodiments, the alkaline earth chloride electrolyte may be magnesium chloride or calcium chloride or strontium chloride.

The carbonates of the alkaline earths have a small but significant solubility in their high temperature chlorides. In one embodiment, the carbonates are reacted with carbon and water to produce carbon dioxide, metal ions and hydrogen ions on high surface-area nickel anodes. Transferred through a ceramic cloth, these ions react (at the porous nickel cathode) with carbon dioxide from the anode and oxygen from air to regenerate the alkaline earth carbonate. Thus, in one embodiment, the alkaline earth chlorides form a low cost cell in which a single cell converts carbon to carbon dioxide, producing electricity.

The chemical reactions occurring in the fuel cell contemplated by these embodiments can be summarized as:

| Location | Reaction | Reaction Number |
|---|---|---|
| Anode: | $MgCO_3 + 2C + 3H_2O \leftrightarrows 3CO_2 + Mg^{2+} + 6H^+ + 8e^-$ | 13 |
| Cathode: | $Mg^{2+} + 6H^+ + 8e^- + CO_2 + 2O_2 \leftrightarrows MgCO_3 + 3H_2O$ | 14 |
| Net Rxn: | $2C + 2O_2 \leftrightarrows 2CO_2$ Delta $G_f = -1.02\ V$ | 15 |

While the magnesium carbonates are shown in this summary, one of skill in the art will recognize that other alkaline earth chlorides including strontium chloride or calcium chloride may be equally useful. The cathode and anode are separated by a proton-permeable membrane, such as a ceramic cloth separator, and hydrates or alternative water-coordinating salts may be used as the reaction media in the cell.

In a related embodiment, carbon and magnesium hydroxide or magnesium oxide are converted to bicarbonate by reaction with carbon dioxide produced in the cell. In a preferred embodiment, the magnesium hydroxide or magnesium oxide and carbon are generated in the formation of carbon from organic waste.

If needed, water can be added to this cell. When water is fed to the anolyte of a magnesium chloride electrolyte cell, carbon dioxide, magnesium ions and hydrogen ions are produced. At the cathode, carbon dioxide and oxygen produce carbonate and regenerate the magnesium carbonate for use in the production of additional carbon.

The reactions occurring in the cell can be summarized as:

| Location | Reaction | Reaction Number |
|---|---|---|
| Anode: | $Mg(OH)_2 + 2CO_2 \leftrightarrows Mg(HCO_3)_2$ | 16 |
| | or $MgO + H_2O + 2CO_2 \leftrightarrows Mg(HCO_3)_2$ | 17 |
| | $Mg(HCO_3)_2 + C \leftrightarrows Mg^{2+} + 3CO_2 + 2H+ + 4e^-$ | 18 |
| Cathode: | $Mg^{2+} + 2H^+ + 4e^- + CO_2 + O_2 \leftrightarrows MgCO_3 + H_2O$ | 19 |
| Net Rxn: | $2C + 2O_2 \leftrightarrows 2CO_2$ Delta $G_f = -1.02\ V$ | 15 |

In this embodiment, a preferred anode is a high surface-area nickel anode and a preferred cathode is a porous nickel cathode. The cathode and anode are separated by an ion-permeable membrane, such as a ceramic cloth separator, and hydrates or alternative water-coordinating salts may be used as the reaction media in the cell. The preferred temperature of operation for the cell is between about 135° C. and about 170° C. Preferably, the operating temperature is about 150° C.

Processes that use magnesium carbonate as a source of carbonate ion for the conversion of organic wastes to carbon and water are described in international application number PCT/US2004/012343 (WO 2004/096456 A2) which is incorporated herein in its entirety. These processes result in the formation of various amounts of carbon with magnesium hydroxide or magnesium oxide.

Certain elements such as iron, manganese and cerium form carbonates at a lower valence but become oxides or hydroxides at a higher valence. These elements have a catalytic action in converting carbon and water to carbon dioxide and hydrogen ions. Thus, in one preferred embodiment, a hydrated electrolyte is used in a carbon-fueled fuel cell utilizing a hydroxide or hydrated oxide which changes valence state at the anode and cathode to generate carbon dioxide at the anode and a carbonate at the cathode.

A hydrated chloride electrolyte is used in these cells at temperatures of between about 135° C. and about 170° C. Preferably, the operating temperature of these cells is about 150° C. The preferred anode is a high surface-area nickel anode and the preferred cathode is a porous nickel cathode. The cathode and anode are separated by a proton-permeable membrane such as a ceramic cloth separator. The reactions occurring in these fuel cells are summarized for each element as follows:

| Location | Reaction | Reaction Number |
|---|---|---|
| Anode: | $FeCO_3 + C + 4H_2O \leftrightarrows Fe(OH)_3 + 2CO_2 + 5H^+ + 5e^-$ | 20 |
| Cathode: | $5e^- + 5H^+ + Fe(OH)_3 + CO_2 + O_2 \leftrightarrows FeCO_3 + 4H_2O$ | 21 |

| Location | Reaction | Reaction Number |
|---|---|---|
| Anode: | $MnCO_3 + C + 3H_2O \leftrightarrows MnO_2 + 2CO_2 + 6H^+ + 6e^-$ | 22 |
| Cathode: | $6e^- + 6H^+ + MnO_2 + CO_2 + O_2 \leftrightarrows MnCO_3 + 3H_2O$ | 23 |

| Location | Reaction | Reaction Number |
|---|---|---|
| Anode: | $Ce_2(CO_3)_3 + 2C + 3H_2O \leftrightarrows 2CeO_2 + 5CO_2 + 6H^+ + 6e^-$ | 24 |
| Cathode: | $6e^- + 6H^+ + 2CeO_2 + 3CO_2 + O_2 \leftrightarrows Ce_2(CO_3)_3 + 3H_2O$ | 25 |

Additional objects, advantages, and novel features of this invention will become apparent to those skilled in the art upon examination of the following examples thereof, which are not intended to be limiting.

EXAMPLES

Example 1

A commercial alkali-hydrogen fuel cell (Astri Lab™ Cell 50) with two, 50 square centimeter anodes and cathodes was used to generate electricity using an alkali hydroxide slurry with activated carbon. The electrolyte was 75% KOH with 0.2 grams of activated carbon circulated to the anode by gravity and air lift. Air was supplied to the cathode by a pump. At 60° C., the cell showed 0.6 Volts and 0.25 amps, generating 0.15 watts. This example shows that, even at low temperatures, carbon can produce electricity in a fuel cell of the present invention.

Example 2

Using the fuel cell described in Example 1, an anolyte of strontium chloride dihydrate (60%) with strontium hydroxide (added to pH 10) and 0.2 grams of activated carbon was circulated. At 80° C., the cell had an open circuit voltage of 0.2 Volts and produced 0.18 amps at 0.15 Volts. This illustrates that even with the higher resistivity of the hydrated chlorides compared to the alkali hydroxides, carbon can produce electricity at low temperatures in the fuel cells of the present invention.

Example 3

As the fuel cells described in Examples 1 and 2 were limited to operation below 80° C., a fuel cell consisting of a 316 stainless steel cathode and graphite anode was built. The effective surface area of anode and cathode was 8 square inches (51 square centimeters). The gap between anode and cathode with no internal diaphragm was about one inch. Four hundred milliliters of a 70% sodium hydroxide solution having 10 grams of activated carbon was prepared. Four grams of cerium sulphate (cerium oxide after reaction with the excess of caustic) was added to this solution.

At an operating temperature of about 135° C., this cell produced 0.7 Volts open circuit. It produced 37.5 milliamps at 0.5 Volts. In order to better establish the reaction rate for carbon, a rectifier was attached to provide a voltage and current flow. At an induced 1.5 Volts and 6.3 amps, the cell produced 1.8 Volts and 7.9 amps. The output less input was 4.8 watts or 94 milliwatts per square centimeter. This example illustrates that at temperatures of about 135° C., even a crude carbon-fueled cell is capable of practical electricity production. This cell had no oxygen fed to the cathode and therefore operated strictly as a hydrogen-producing cell, demonstrating the practicality of electrolytic production of hydrogen from carbon.

Example 4

The same electrolyte and cell described in Example 3 was maintained at an operating temperature of about 155° C. With 25 square centimeters of electrode surface, the cell produced 0.175 amps at 0.6 Volts. This example illustrates that higher watts result from operating the cell at a higher temperature within the target temperature range.

Example 5

Carbon was prepared from rubber contained in auto shredder residue which included pieces of automobile tires by the methods described in international application PCT/US2004/012343 (WO 2004/096456 A2). Four hundred milliliters of 60% sodium hydroxide was slurried with 10 grams of this carbon and used with the fuel cell and the electrolyte combination described in Example 4.

At 120° C., the cell produced 0.6 Volts, 0.16 amps, and 96 milliwatts or 4 miiliwatts per square centimeter. At 135° C., the cell produced 0.7 Volts, 0.65 amps, and 455 milliwatts or 18 milliwatt per square centimeter. At 150° C. and an induced voltage of 1 Volt and 0.6 amps, the cell produced 1.5 Volts and 0.8 amps. The added electric output was 600 milliwatts or 24 milliwatts per square centimeter. This example shows that the carbon prepared from waste by the process described in co-pending international patent application PCT/US2004/012343 (WO 2004/096456 A2) is equal to activated carbon in producing electricity in the fuel cells of the present invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A fuel cell comprising:
    an anode in contact with an alkaline earth carbonate, activated carbon and water;
    a cathode in contact with carbon dioxide and oxygen;
    a ceramic cloth that separates the anode and the cathode;
    an electrolyte comprising a hydrated alkaline earth chloride selected from the group consisting of hydrated magnesium chloride, hydrated calcium chloride, hydrated strontium chloride, and mixtures thereof;
    said fuel cell being operable at a temperature of between about 135° C. and about 170° C.

2. The fuel cell of claim 1, wherein the carbon in contact from the electrode comprises carbon recovered from organic waste.

* * * * *